[12] United States Patent
Rühringer et al.

(10) Patent No.: US 7,650,978 B2
(45) Date of Patent: Jan. 26, 2010

(54) ACTUATOR DEVICE FOR ACTUATING A LOCKING MECHANISM

(75) Inventors: Uwe Rühringer, Tettnang (DE); Wolfgang Schmid, Langenargen (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 401 days.

(21) Appl. No.: 11/630,534

(22) PCT Filed: Jun. 11, 2005

(86) PCT No.: PCT/EP2005/006284

§ 371 (c)(1), (2), (4) Date: Feb. 5, 2007

(87) PCT Pub. No.: WO2005/124198

PCT Pub. Date: Dec. 29, 2005

(65) Prior Publication Data

US 2008/0277237 A1 Nov. 13, 2008

(30) Foreign Application Priority Data

Jun. 22, 2004 (DE) .................. 10 2004 030 007

(51) Int. Cl.
*F16H 63/48* (2006.01)
*F16H 63/38* (2006.01)
*B60T 7/00* (2006.01)

(52) U.S. Cl. .................. 192/219.6; 188/265; 303/89; 92/21 MR

(58) Field of Classification Search ............. 192/219.6, 192/219.7; 92/21 MR; 477/907
See application file for complete search history.

(56) References Cited

U.S. PATENT DOCUMENTS

| 4,116,113 | A * | 9/1978 | Leclerc ..................... 92/24 |
| 6,179,108 | B1 | 1/2001 | Gierer et al. |
| 6,186,047 | B1 | 2/2001 | Baruffaldi |
| 6,471,027 | B1 | 10/2002 | Gierer et al. |
| 6,527,670 | B1 | 3/2003 | Gierer et al. |
| 6,823,976 | B2 | 11/2004 | Schmid |
| 2002/0092720 | A1 | 7/2002 | Schafer et al. |
| 2005/0098400 | A1 | 5/2005 | Kleinert et al. |

FOREIGN PATENT DOCUMENTS

| DE | 198 48 733 A1 | 4/2000 |
| DE | 198 58 543 A1 | 6/2000 |
| DE | 199 40 029 A1 | 3/2001 |

(Continued)

*Primary Examiner*—Richard M. Lorence
(74) *Attorney, Agent, or Firm*—Davis & Bujold, P.L.L.C.

(57) ABSTRACT

An actuating mechanism (1) for operating a parking-lock mechanism of the drive chain of a vehicle with an automatic drive. The actuating mechanism has a piston unit (4), a detent element and an electromagnetic operating device (6) for operating a release element (7), which is intended for deactivating the detent element (5). The piston unit communicates with an emergency unlocking mechanism (14) and is positioned to open the locking mechanism by way of the piston unit. The detent element, the piston unit and the release element interact such that the locking mechanism remains in the currently engaged state when the locking mechanism is open and the operating device is not electrified, as well as when the locking mechanism is closed and a fluid pressure is applied to the piston unit.

8 Claims, 2 Drawing Sheets

FOREIGN PATENT DOCUMENTS

| | | |
|---|---|---|
| DE | 100 15 782 A1 | 1/2002 |
| DE | 101 05 637 A1 | 8/2002 |
| DE | 102 45 386 A1 | 4/2004 |
| EP | 1 305 542 A1 | 5/2003 |
| EP | 1 408 260 A1 | 4/2004 |
| JP | 11-325243 | 11/1999 |

\* cited by examiner

ACTUATOR DEVICE FOR ACTUATING A LOCKING MECHANISM

This application is a national stage completion of PCT/EP2005/006284 filed Jun. 11, 2005 which claims priority from German Application Serial No. 10 2004 030 007.0 filed Jun. 22, 2004.

FIELD OF THE INVENTION

The invention applies to an actuating device for operating a locking mechanism.

BACKGROUND OF THE INVENTION

From DE 198 48 733 A1, an emergency release device is known for a parking-lock mechanism for a vehicle with an automatic transmission, in which the electronic parking-lock mechanism, which is integrated into the automatic transmission, is actuated when the vehicle is in normal operating mode by way of the person operating the vehicle actuating a gear selector device by engaging the position "P". The parking-lock mechanism is functionally connected to the device by way of a transmission mechanism that is affixed to a static part of the motor vehicle outside the passenger compartment of the motor vehicle by way of which the parking-lock release mechanism can be manually engaged or released, as the case may be. The device also comprises a towing hook for towing the vehicle, which is in a position that releases the parking lock mechanism during towing so that the parking-lock mechanism is securely released during towing.

The device or, as the case may be, the towing hook has two final positions and the towing hook can be immobilized in the final position in which the parking-lock mechanism is unlocked. This ensures that the parking lock mechanism, when it is in an unlocked state, remains securely deactivated even when alternating forces act on the mechanism. If the parking lock mechanism is to be reactivated and the output of the vehicle determined, the immobilization of the device can be released by way of a force being exerted once on the device and the parking-lock mechanism is then reactivated by way of a spring mechanism.

In addition, there is an actuating device known from practice for operating a locking mechanism, particularly for operating a parking-lock latch of a motor vehicle that has a drive chain configured with an automatic transmission, the actuating mechanism having at least one piston unit, displaceable in an axial direction and arranged in a housing, which is admittable with a fluid and which, depending on the fluid pressure, can be operated in the opening direction of the locking mechanism against a spring mechanism working in the direction of the closing mechanism. In addition, the device is configured with a detent element for holding the piston unit in an axial position equivalent to the open state of the locking mechanism, the detent element being automatically activated when the piston unit is in an axial position that is equivalent to the open state of the locking mechanism.

In addition, the actuating device is configured with an electromagnetic operating mechanism for operating a release element intended for deactivating the detent element. The piston unit is functionally connected with an emergency release mechanism by way of which the piston unit can be brought into the axial position that is equivalent to the open state of the locking mechanism.

In the case of the actuating device known from practice or, as the case may be, the known parking-lock actuator, the parking lock is released by way of hydraulic or pneumatic force and engaged by way of spring force. In order for the parking lock to remain in an open state even when there is no fluid pressure, the release element is held by way of the electromagnetic operating mechanism against a spring brake in a position that does not deactivate the detent element so that the piston unit is held by the active detent element in the axial position that is equivalent to the open state of the locking mechanism and the locking mechanism or the parking-lock latch does not engage with a parking-lock wheel that is connected to the power train.

If the function of neither the electromagnetic operating device nor the hydraulic or, as the case may be, pneumatic system is available, the parking lock of the motor vehicle will be engaged by way of the spring device that acts in the closing direction of the locking mechanism through activation of the locking mechanism. This results from the fact that when the electromagnetic operating mechanism is not electrified, the release element is displaced by the spring brake assigned to the release element in such a way that the detent element is deactivated. This means that when there is a system failure in the motor vehicle during which neither hydraulic nor pneumatic pressure can be produced and when electrical power from the vehicle electrical system is not available either, the parking lock is assigned to engaged status as the preferred position, which arrests the output of the vehicle.

This performance is desirable in cases where the transmission can be operated when electrical power fails by way of a hydraulic or pneumatic emergency program and the parking lock can be prevented from engaging. In a vehicle configured in this way, the driver still has the possibility of maneuvering the vehicle to a location determined by the driver and parking the vehicle there in a secure state.

However, if the vehicle is not configured with a hydraulic or pneumatic emergency program, the parking lock that interacts with an actuating mechanism of the prior art will automatically engage so that output is disadvantageously arrested and the driver can initially move the vehicle only with the assistance of external auxiliary devices, such as a tow truck, for example.

Of course, it lies within the discretion of a person skilled in the art to configure the actuating device with an emergency release mechanism in the manner known from the state of the art, by way of which the parking lock can be manually deactivated. However, releasing the parking lock requires action on the part of the driver in the form of operating the emergency release mechanism, which, however, is not desirable in some situations.

The task set for the present invention was, therefore, to provide an actuating device for operating a locking mechanism, in particular a mechanism for operating a parking lock of a drive chain of a vehicle configured with an automatic transmission, with which the parking-lock latch would remain in the last position selected in the event of a system failure and, in which case, it would be possible to simply deactivate or activate manually, as required by the driver.

SUMMARY OF THE INVENTION

The use of the actuating mechanism configured, according to the invention, in order to operate a locking mechanism, in particular to actuate a parking-lock latch of a drive chain configured with an automatic transmission, results in a parking-lock latch remaining in its last selected position in the event of a system failure, a parking lock remaining open or closed, as there is no preferred position in the event of a system failure.

This objective is achieved through the detent element, the piston unit and the release element of the actuator device interacting in such a way that the locking mechanism remains in the current selection position when the locking mechanism is open and the electromagnetic operating device is not electrified, just as it does when the locking mechanism is locked and a fluid pressure is applied to the piston unit, the force component acting on the piston unit in the opening direction of the locking mechanism being smaller than a release force of the locking mechanism.

In addition, the use of the actuating mechanism, according to the invention, gives the operator or the driver of the vehicle the possibility of closing or manually opening the locking mechanism or the parking lock, in a simple manner, based on the present status of the locking mechanism after a system failure.

This is accomplished, on the one hand, through the configuration of the actuating mechanism with an emergency release mechanism that is functionally connected to the piston unit by way of which mechanism the piston unit can be brought into the axial position that is equivalent to the open status of the locking mechanism and, on the other hand, by providing an emergency release mechanism by way of which the detent element can be deactivated so that the piston unit is displaced into its axial position equivalent to the closed state of the locking mechanism through the spring force of the spring device acting in the closing direction of the locking mechanism.

BRIEF DESCRIPTION OF THE DRAWINGS

The invention will now be described, by way of example, with reference to the accompanying drawings. For clarity, the same reference numerals are used for components with the same construction and function in different versions of configuration. The following are shown.

DETAILED DESCRIPTION OF THE INVENTION

Figure 1:
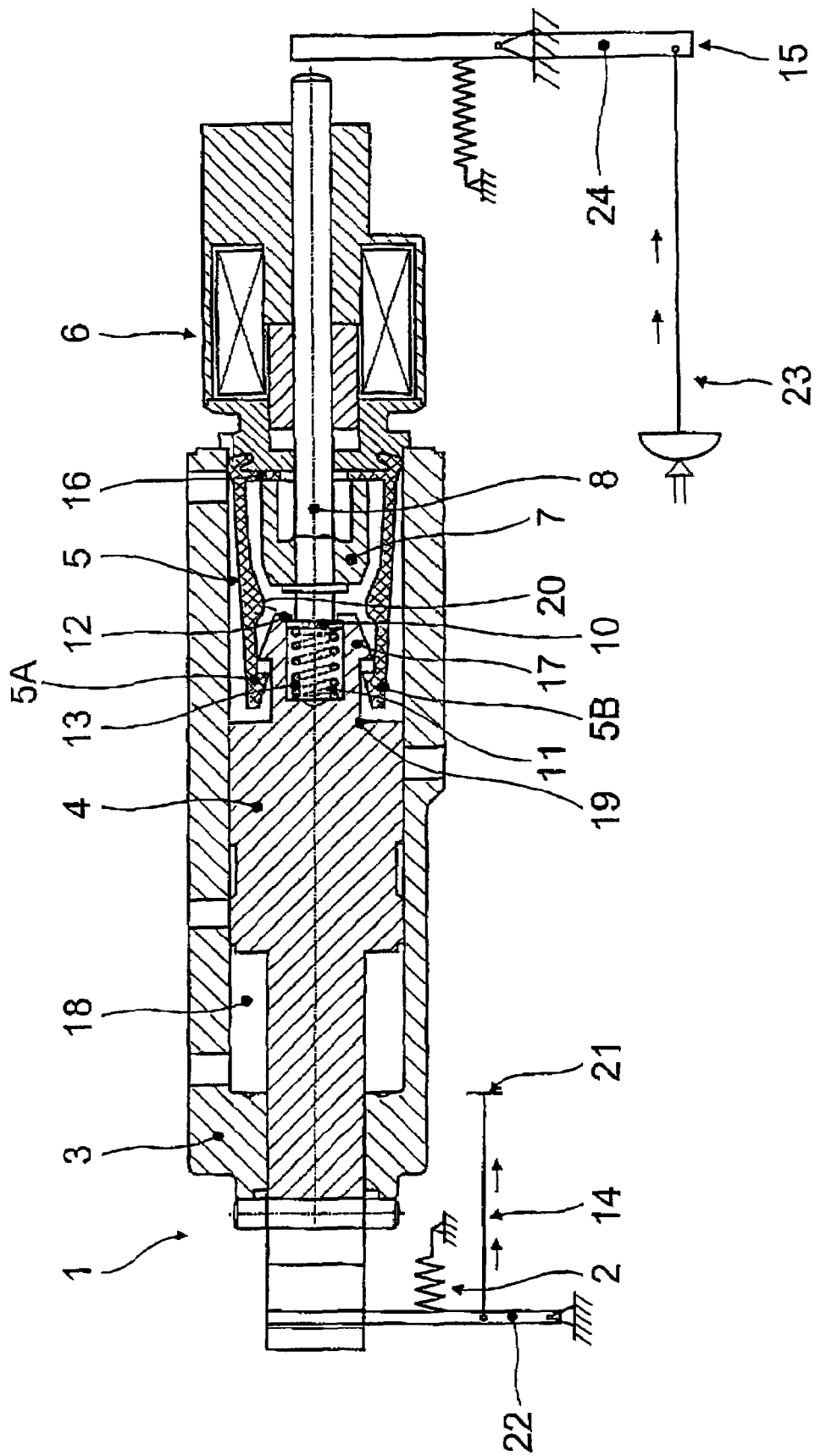
FIG. 1 is a diagrammatic longitudinal-section view of a first version of configuration of the actuating device according to the invention.

FIG. 1 shows a diagrammatic longitudinal-section view of an actuating mechanism 1 for activating a locking mechanism (not shown in more detail), and which is a known parking-lock device of a motor vehicle with a drive chain that is configured with an automatic transmission. The actuator state "parking lock released" is shown. The actuating device 1 has a piston unit 4, arranged in a housing 3, that can be displaced in an axial direction, and which can be acted upon by a fluid and which, depending on fluid pressure, can be operated against a spring mechanism 2 that works in the closing direction of the locking mechanism.

In an installed state, the piston unit 4 is connected (not presented in more detail), to a parking rod of the parking-lock mechanism, the parking rod, in turn, being functionally connected to a parking-lock latch in such a way that the parking rod can be engaged with a parking-lock wheel that is connected in a torque-proof fashion to the drive of the drive shaft, due to an axial movement of the piston unit and the parking rod connected to it or disengaged from the parking-lock rod.

In addition, the actuating mechanism 1 is configured with a detent element 5 that is automatically activated when the piston unit 4 is in an axial position that is equivalent to an open state of the locking mechanism in order to retain the piston unit 4 in an axial position that is equivalent to the open state of the locking mechanism. In addition, the actuating mechanism 1 is configured with an electromagnetic operating device 6 for activating a release element 7, which is intended for deactivating the detent element 5 and which is connected to a piston rod 8, together with which piston rod 8 is arranged in a longitudinally maneuverable way within the housing 3.

On the end facing the piston unit 4, the piston rod 8 is connected to the piston unit 4, via a spring ring 10, the spring ring 10 being pressed against an internal catch 12 of the piston unit 4 in an axial direction via a spring element 11. This means that relative movement against the tension of the spring element 11 is possible between the piston rod 8 and the piston unit 4 within constructively specified limits, because the end of the piston rod 8 that faces the piston unit 4 plunges into a borehole 13 of the piston unit 4, inside which the spring element 11 is also arranged.

The end of the piston unit 4 that faces away from the piston rod 8 is functionally connected to the locking mechanism (not presented in detail), and to an emergency unlocking mechanism 14 in such a way that the piston unit 4 is displaceable into the axial position equivalent to the open state of the locking mechanism from the axial position equivalent to the closed state of the locking mechanism via the emergency unlocking mechanism 14.

In addition, the piston rod 8, at the end facing away from the piston unit 4, is functionally connected with an emergency locking mechanism 15 by way of which the piston rod 8 and the release element 7 connected to it can be manually displaced in the direction of the piston unit 4 by the operator or the driver of the vehicle in order to engage the parking-lock device, if required.

In the normal operating mode, during which the piston unit is acted upon by a fluid pressure and the electromagnetic operating device can be electrified, the actuating mechanism 1, shown in FIG. 1, displays the following mode of operation.

Based on the operating state, shown in FIG. 1, in which the end of the release element 7 facing the electromagnetic operating device 6 abuts on radially arranged areas 16 of the detent element 5 and is encompassed by an at least approximately conical area 17 of the piston unit 5 of the detent element, the piston unit 4 is in an axial position equivalent to an open state of the locking mechanism or of the parking-lock mechanism.

In the state of the actuator mechanism 1, shown in FIG. 1, the detent element 5 is activated so that the piston unit 4 is retained by dump arms 5A and 5B, only two of the preferably four dump arms placed at regular intervals along the length of the piston unit 4, shown in FIG. 1, in such a way that automatic engagement of the parking-lock latch is securely avoided even when there is no abutting fluid pressure in the annulus 18.

If the parking-lock mechanism is to be engaged on the basis of driver-wish input delivered, via a gear-selector device, the electromagnetic operating device 6 is electrified in such a way that the release element 7, together with the piston rod 8, is slid in the direction of the piston unit 4 from the position, shown in FIG. 1, between the dump arms 5A and 5B and the detent element 5. When this takes place, with the increasing displacement path, the end of the release element 7 facing the piston unit 4, which is configured with a beveled or conical area, engages with an intermediate area 20 of the dump arms 5A and 5B, which corresponds to the conical area of the release element 7 and is configured as beveled or as the case may be conical, so that the dump arms 5A and 5B of the release element 7 are pushed further and further outward, until the form closure between the detent element 5 and the piston unit 4 is overridden in the area of the reduced diameter area 19. When the parking lock engages, the annulus 18 is without pressure and the electromagnetic operating device 6 is switched off.

If a resulting component of force, consisting respectively of the spring force of the spring mechanism 2 and the fluid pressure currently abutting the annulus 18, which works in the closing direction of the locking mechanism acts on the piston unit 4, the piston unit 4 is displaced toward the electromagnetic operating device 6, until the parking-lock mechanism is released. If the parking-lock mechanism is engaged, the piston unit 4 is pushed out of the engagement area of the dump arms 5A and 5B so that the detent element is deactivated.

After that, electric current for the electromagnetic operating device 6 is shut off, whereupon the release element 7, due to the spring force of the spring element 11, is again pressed against the radial area 16 of the detent element 5 in the manner shown in FIG. 1. As the dump arms 5A and 5B are configured with a spring tension that acts in the direction of the centerline of the actuating mechanism 1, the dump arms 5A and 5B fold inward in a radial direction.

If the annulus 18, in the last-mentioned state of the actuating mechanism 1, is, in turn, subjected to a fluid pressure that causes the resulting component of force acting on the piston unit 4 to work in the direction of the release element 7, the piston unit 4 will be displaced from its axial position equivalent to the closed state of the adaptation mechanism in the direction of the electromagnetic operating device 6, until the detent element 5 is activated in the manner described below.

Due to the fluid pressure, which may be produced hydraulically or pneumatically, and which prevails in the annulus 18, which is defined by the housing 3 and the piston unit 4, the piston unit 4 is displaced in an axial direction from its axial position equivalent to the closed state of the locking mechanism in the direction of the electromagnetic operating device 6. During the axial displacement of the piston unit 4, as the displacement path of the piston unit 4 increases, the dump arms 5A and 5B of the detent element 5, which are folded inward in the direction of the midline of the actuating mechanism 1, are guided via the conical area 17 toward the piston unit, starting in each case from their ends facing the piston unit 4, their inner sides that face the piston unit 4 also being conically configured.

Due to the initial tension of the dump arms 5A and 5B, which works in the direction of the piston unit 4, the ends of the dump arms 5A and 5B come to rest against the piston unit 4 in a narrow-diameter area 19 of the piston unit 4 after traversing the conical area 17. As both dump arms 5A and 5B and the piston unit 4, respectively, are configured with heels at the end of their conical areas 17 that face each other and are intended as contact surfaces between the dump arms 5A and 5B and the piston unit 4, the piston unit 4 is held by the detent element 5 in the position shown in FIG. 1 due to the positive tie between the dump arms 5A and 5B of the piston unit 4, despite the resulting component of force working on it in the closing direction of the locking mechanism.

The resulting component of force, which works in the closing direction of the locking mechanism then acts on the piston unit 4 when the spring pressure of the spring mechanism 2 is greater than the hydraulic or pneumatic pressure force of the annulus 18 working on the piston unit 4.

In addition, the actuating mechanism, shown in FIG. 1 is configured so that the actuating mechanism 1 remains in the last state it assumed, i.e., open or closed, in the event of a system failure of the control system required for the operating method described above, when there is neither a fluid pressure available in the annulus 18 for operating the piston 4 nor the possibility of an electrification of the electromagnetic operating device 6. In order to ensure that the locking mechanism or the parking-lock mechanism can still be activated, there is provision for the emergency unlocking mechanism 14 and the emergency locking mechanism 15, which give the driver the possibility of manually unlocking the currently engaged parking-lock mechanism or manually engaging the currently released parking-lock mechanism.

In order to do this, the emergency unlocking mechanism 14 interacts via a functional mechanism 21, which is configured in a discretionary manner with a mechanical transmission element which, in this case, is configured as a lever element 22, with the piston unit 4 in such a way that the piston unit 4 can be manually displaced by the driver via the functional mechanism 21 of the emergency unlocking mechanism 14 from its axial position equivalent to a closed state of the locking mechanism, shown in FIG. 1, to its axial position equivalent to an open state of the locking mechanism until the detent element 5 is activated and the piston unit 4 is held in this position against the spring force of the spring mechanism 2.

With this operating condition of the actuating mechanism 1 and the parking-lock mechanism that is unlocked in achieving it, vehicle output is released and the vehicle can be brought to a destination that the driver chooses by towing or pushing the vehicle in a simple manner.

However, if it is necessary to secure the vehicle against coasting when it is turned off, it is advantageous if the locking mechanism can be returned by the operator to its closed state.

That is done via the emergency locking mechanism 15, which has another user-defined functional mechanism 23 and an additional actuating element which, in this case, is also depicted as a lever arm element 24. The lever arm element 24 transfers a control force applied by the driver via the additional functional mechanism 23 to the piston rod 8 in such a way that the piston rod 8, together with the release element 7 is pushed between the dump arms 5A and 5B, and the mechanical (positive) connection between the detent element 5 and the piston unit 4 is broken. As soon as the detent element 5 is deactivated by the release element 7, the piston unit 4 of the spring mechanism 2 is brought into its axial position equivalent to the closed state of the locking mechanism, and the parking-lock mechanism is engaged.

Figure 2:
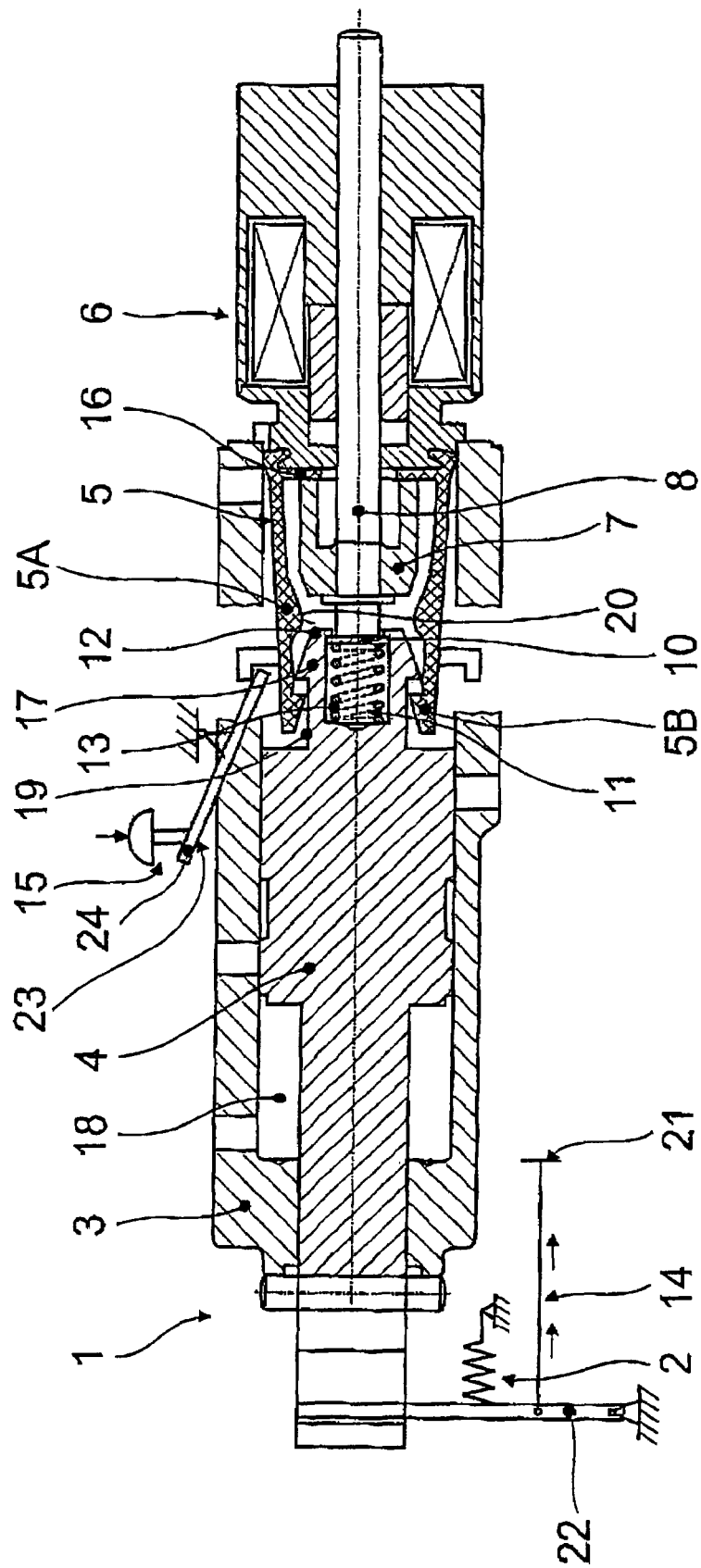
FIG. 2 is a second version of configuration of an actuating device according to the invention in a diagrammatic longitudinal-section view.

FIG. 2 shows a further version of an actuating mechanism 1 configured, according to the invention, which differs from the version, shown in FIG. 1, solely by having a different constructive configuration of the emergency locking mechanism 15 so that the following description provides only details concerning the differences.

In the case of the actuating device 1, shown in FIG. 2, the emergency locking mechanism 15 is configured with one lever arm element 24 by way means of which the dump arms 5A and 5B can be directly activated. One end of the lever-arm element 24 acts directly on the dump arms 5A and 5B, so that with the corresponding operation of the lever arm element 24, the mechanical (positive) connection between the detent element 5 and the piston unit 4 is broken by moving the dump arms 5A and 5B in an outward radial direction, i.e., away from the piston unit 4 or the reduced diameter area 19 of the piston unit 4.

In this version, each of the dump arms 5A and 5B is assigned to a lever arm element 24 mounted on the housing 3, which can be operated in the corresponding way via a functional mechanism 23.

In the embodiment of the actuating mechanism according to FIG. 2, the dump arms 5A, 5B can be forced apart in a manner not described in further detail by way of a linkage or any other constructive configuration of the emergency locking mechanism 15, so that the parking lock engages-automatically with a deactivated detent element due to the spring force of the spring mechanism 2.

REFERENCE NUMERALS 1 actuating mechanism
2 spring mechanism
3 housing
4 piston unit
5 detent element
5A, 5B dump arm
6 electromagnetic operating device
7 release element
8 piston rod
10 spring ring
11 spring element
12 internal catch
13 borehole
14 emergency unlocking mechanism
15 emergency locking mechanism
16 radial area of the detent element
17 conical area of the piston unit
18 annulus
19 reduced diameter area of the piston unit
20 conical area of the dump arms
21 functional mechanism
22 lever element
23 additional functional mechanism
24 lever arm element

The invention claimed is:

1. An actuating device (1) for operating a parking-lock mechanism of a drive train of a vehicle having an automatic transmission, the parking-lock mechanism comprising:
at least one piston unit (4), which is arranged in a housing (3) and is axially displaceable in an opening direction to disengage the parking-lock mechanism and in a closing direction to engage the parking-lock mechanism;
a spring mechanism (2) biases the piston unit (4) which biases the parking-lock mechanism to a closed state against a pressurized fluid, which biases the piston unit (4) in and open direction;
a detent element (5), when an axial position of the piston unit (4) is equivalent to an open state of the parking-lock mechanism, is automatically activated to retain the piston unit (4) in the axial position equivalent to the open state of the parking-lock mechanism;
an electromagnetic operating device (6) for operating a release element (7), which deactivates the detent element (5), wherein
the detent element (5), the piston unit (4), and the release element (7) interact such that when the detent element (5) is deactivated, the parking-lock mechanism remains open and the electromagnetic operating device (6) is without electric current, and
a fluid pressure is applied to the piston unit (4) to provide a force component to bias the piston unit (4) which biases the parking-lock mechanism in the opening direction, the force component being smaller than a release force of the parking-lock mechanism; and
an emergency unlocking mechanism functionally connected to the piston unit (4) and which biases the piston unit (4) into the axial position equivalent to the open state of the parking-lock mechanism, the emergency unlocking mechanism (14) including a first manually actuated lever-arm (22) or manually displacing the piston unit (4) from its axial position equivalent to a closed state of the locking mechanism, whereby the parking-lock mechanism is disengaged, and
an emergency locking mechanism (15) including a manually actuated second lever-arm (24) for deactivating the detent element (5) whereby the piston unit (4) is brought into its axial position equivalent to the closed state of the locking mechanism, whereby the parking-lock mechanism is engaged.

2. The actuating mechanism according to claim 1, wherein the emergency locking mechanism (15) directly controls at least one dump arm (5A, 5B) such that a functional connection between the dump arm (5A, 5B) and the piston unit (4) is broken.

3. The actuating mechanism according to claim 2, wherein the second lever-arm element (24) communicates with the et least one dump arm (5A, 5B) to break a positive connection between the at least one dump arm (5A, 5B) and the piston unit (4).

4. The actuating mechanism according to claim 3, wherein the second lever element (24) is mounted on the housing (3).

5. The actuating mechanism according to claim 2, wherein the emergency locking mechanism (15) acts against an initial tension of the at least one dump arm (5A, 5B) to break a positive mechanical lock between the at least one dump arm (5A, 5B) and the piston unit (5).

6. The actuating mechanism according to claim 1, wherein the electromagnetic operating device (6) biases the release element (7) from an initial position, in which the detent element (5) is activated, into a second position that deactivates the detent element (5).

7. An actuating device (1) for operating a parking-lock mechanism of a drive train of a vehicle having an automatic transmission, the parking-lock mechanism comprising:
at least one piston unit (4), which is arranged in a housing (3) and is axial displaceable in an opening direction to disengage the parking-lock mechanism and in a closing direction to engage the parking-lock mechanism;
a spring mechanism (2) biases the piston unit (4) which biases the parking-lock mechanism to a closed state against a pressurized fluid, which biases the piston unit (4) in and open direction;
a detent element (5), when an axial position of the piston unit (4) is equivalent to an open state of the parking-lock mechanism, is automatically activated to retain the piston unit (4) in the axial position equivalent to the open state of the parking-lock mechanism;
an electromagnetic operating device (6) for operating a release element (7), which deactivates the detent element (5), wherein
the detent element (5), the piston unit (4), and the release element (7) interact such that when the detent element (5) is deactivated the parking-lock mechanism remains open and the electromagnetic operating device (6) is without electric current, and
a fluid pressure is applied to the piston unit (4) to provide a force component to bias the piston unit (4) which biases the parking-lock mechanism in the opening direction, the force component being smaller than a release force of the parking-lock mechanism; and
an emergency unlocking mechanism functionally connected to the piston unit (4) and which biases the piston unit (4) into the axial position equivalent to the open state of the parking-lock mechanism, the emergency unlocking mechanism (14) including a first manually actuated lever-arm (22) for manually displacing the piston unit (4) from its axial position equivalent to a closed state of the locking mechanism, and an emergency locking mechanism (15) including a manually actuated second lever-arm (24) for deactivating the detent element (5) whereby the piston unit (4) is brought into its axial position equivalent to the closed state of the locking mechanism wherein the parking-lock mechanism is engaged, wherein the detent element (5) has at least one dump arm (5A, 5B) to engage and retain the piston unit (4), when the piston unit (4) is in an axial position equivalent to the open state of the parking-lock mechanism, against a spring force of the spring mechanism (2), the at least one dump arm (5A, 5B) is activated via the release element (7) such that the functional connection between the at least one dump arm (5A, 5B) and the piston unit (4) is interrupted, and wherein the second lever element (24) of the emergency locking mechanism (15) communicates with a piston rod (8) connected to the release element (7), wherein the second lever element (24) biases the piston rod (8) and the release element (7) into a functional connection with the dump arm (5A, 5B) such that a locked engagement between the at least one dump arm (5A, 5B) and the piston unit (4) can be broken against an initial spring tension of the dump arm (5A, 5B).

8. The actuating mechanism according to claim 7, wherein an end of the piston rod (8) that interacts with the first lever element (22) protrudes from the housing (3).

* * * * *